US012701277B2

(12) United States Patent
Bohunek et al.

(10) Patent No.: US 12,701,277 B2
(45) Date of Patent: Aug. 4, 2026

(54) EFFICIENT STREAMING FORMAT

(71) Applicant: NBCUniversal Media, LLC, New York, NY (US)

(72) Inventors: David Bohunek, New York, NY (US); Naman Diwaker, Weehawken, NJ (US)

(73) Assignee: NBCUniversal Media, LLC, New York, NY (US)

( * ) Notice: Subject to any disclaimer, the term of this patent is extended or adjusted under 35 U.S.C. 154(b) by 335 days.

(21) Appl. No.: 18/202,489

(22) Filed: May 26, 2023

(65) Prior Publication Data

US 2024/0397125 A1    Nov. 28, 2024

(51) Int. Cl.
| | |
|---|---|
| *H04N 7/173* | (2011.01) |
| *H04N 21/235* | (2011.01) |
| *H04N 21/239* | (2011.01) |
| *H04N 21/435* | (2011.01) |
| *H04N 21/439* | (2011.01) |
| *H04N 21/44* | (2011.01) |
| *H04N 21/4627* | (2011.01) |

(52) U.S. Cl.
CPC ..... *H04N 21/2353* (2013.01); *H04N 21/2393* (2013.01); *H04N 21/435* (2013.01); *H04N 21/439* (2013.01); *H04N 21/44* (2013.01); *H04N 21/4627* (2013.01)

(58) Field of Classification Search
CPC ........... H04N 21/2353; H04N 21/2393; H04N 21/435; H04N 21/439; H04N 21/44; H04N 21/4627; H04N 21/26258; H04N 21/8456
See application file for complete search history.

(56) References Cited

U.S. PATENT DOCUMENTS

| | | | | |
|---|---|---|---|---|
| 9,532,113 B2 * | 12/2016 | Thorwirth | ........ | H04N 21/23439 |
| 11,017,816 B2 * | 5/2021 | Ahsan | .................. | G11B 27/322 |
| 11,218,784 B1 * | 1/2022 | Mekuria | ............... | H04N 21/84 |
| 2013/0058480 A1 * | 3/2013 | Ziskind | ............. | H04N 21/4344 375/E7.026 |
| 2015/0221316 A1 * | 8/2015 | Mufti | ................... | G10L 19/018 700/94 |
| 2016/0164841 A1 * | 6/2016 | Mikhailov | ............ | G06F 21/128 726/12 |

(Continued)

*Primary Examiner* — Annan Q Shang
(74) *Attorney, Agent, or Firm* — Fletcher Yoder, P.C.

(57) ABSTRACT

A streaming media system and streaming format that uses a streamlined JavaScript Object Notation (JSON) manifest to enable improved streaming performance over existing streaming formats. The JSON manifest includes global objects that define certain unique (e.g., non-redundant, non-duplicative) global parameters that can pertain to any or all of the audio/video segments, along with a corresponding unique identifier to refer to the global object. The JSON schema also includes respective local objects that define local parameters for each of the audio/video segments, including one or more parameters that refer to a global object using the unique identifier of the global object, as opposed to duplicating information of the global object within the audio/video information objects themselves. As such, the disclosed JSON manifest demonstrates a substantially smaller file size, substantially faster downloading and processing time, and substantially fewer objects being ingested during processing, relative to the manifests of other streaming formats.

31 Claims, 6 Drawing Sheets

(56)           References Cited

U.S. PATENT DOCUMENTS

| | | | |
|---|---|---|---|
| 2016/0381405 A1* | 12/2016 | Smith | H04N 21/8355 |
| | | | 725/28 |
| 2018/0192106 A1* | 7/2018 | Loheide | H04N 21/2187 |
| 2020/0221159 A1* | 7/2020 | Stockhammer | H04N 21/23439 |
| 2021/0266641 A1* | 8/2021 | Selfors | G06F 16/7867 |
| 2021/0385522 A1* | 12/2021 | Giladi | H04N 21/2362 |
| 2022/0103883 A1* | 3/2022 | Cunningham | H04N 21/434 |
| 2022/0182732 A1* | 6/2022 | Brockmann | H04N 21/47217 |
| 2023/0102525 A1* | 3/2023 | Nagao | H04L 9/3247 |
| | | | 705/51 |
| 2023/0328308 A1* | 10/2023 | Marciano | H04N 21/44008 |
| 2024/0251140 A1* | 7/2024 | Jost | H04N 21/2393 |
| 2025/0117451 A1* | 4/2025 | Hunsberger | G06F 21/107 |

* cited by examiner

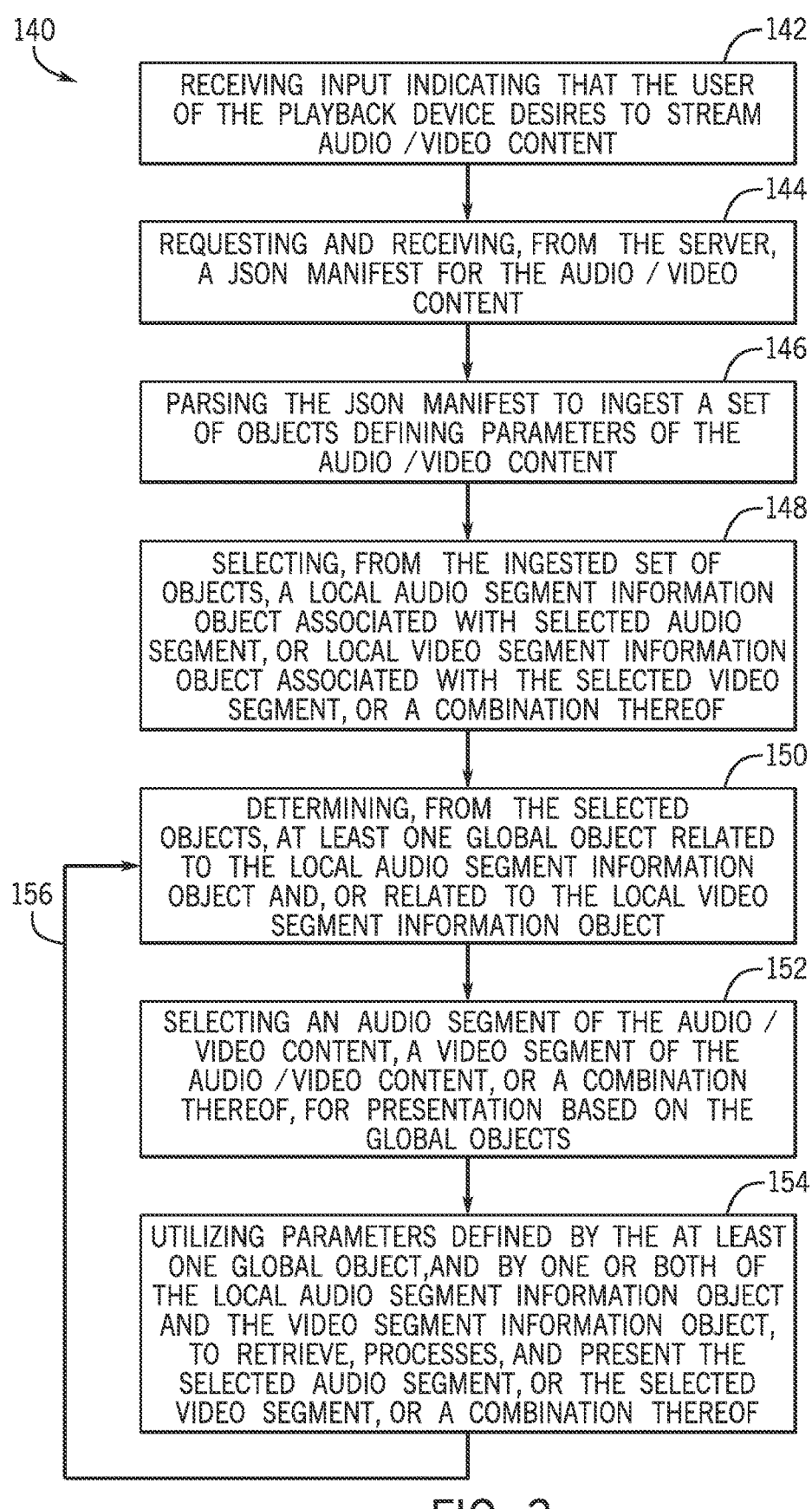

140

142
RECEIVING INPUT INDICATING THAT THE USER OF THE PLAYBACK DEVICE DESIRES TO STREAM AUDIO / VIDEO CONTENT

144
REQUESTING AND RECEIVING, FROM THE SERVER, A JSON MANIFEST FOR THE AUDIO / VIDEO CONTENT

146
PARSING THE JSON MANIFEST TO INGEST A SET OF OBJECTS DEFINING PARAMETERS OF THE AUDIO / VIDEO CONTENT

148
SELECTING, FROM THE INGESTED SET OF OBJECTS, A LOCAL AUDIO SEGMENT INFORMATION OBJECT ASSOCIATED WITH SELECTED AUDIO SEGMENT, OR LOCAL VIDEO SEGMENT INFORMATION OBJECT ASSOCIATED WITH THE SELECTED VIDEO SEGMENT, OR A COMBINATION THEREOF

150
DETERMINING, FROM THE SELECTED OBJECTS, AT LEAST ONE GLOBAL OBJECT RELATED TO THE LOCAL AUDIO SEGMENT INFORMATION OBJECT AND, OR RELATED TO THE LOCAL VIDEO SEGMENT INFORMATION OBJECT

156

152
SELECTING AN AUDIO SEGMENT OF THE AUDIO / VIDEO CONTENT, A VIDEO SEGMENT OF THE AUDIO / VIDEO CONTENT, OR A COMBINATION THEREOF, FOR PRESENTATION BASED ON THE GLOBAL OBJECTS

154
UTILIZING PARAMETERS DEFINED BY THE AT LEAST ONE GLOBAL OBJECT, AND BY ONE OR BOTH OF THE LOCAL AUDIO SEGMENT INFORMATION OBJECT AND THE VIDEO SEGMENT INFORMATION OBJECT, TO RETRIEVE, PROCESSES, AND PRESENT THE SELECTED AUDIO SEGMENT, OR THE SELECTED VIDEO SEGMENT, OR A COMBINATION THEREOF

FIG. 3

EFFICIENT STREAMING FORMAT

BACKGROUND

This disclosure relates generally to streaming media, and more specifically to manifest files for streaming media, such as streaming audio and/or video content.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A significant portion of media content produced today is consumed via streaming. For example, a consumer may use a content player of an internet-connected device (e.g., a smartphone, computer, or television) to access and stream audio and/or video content for consumption over Hypertext Transfer Protocol (HTTP). For example, Dynamic Adaptive Streaming over HTTP (DASH) and HTTP Live Streaming (HLS) are two streaming protocols that are commonly used for streaming media, and both of these protocols utilize manifests. These manifests are files, such as text files or Extensible Markup Language (XML) files, downloaded and processed by the content player to determine parameters defining how each audio and/or video segment of the requested content should be retrieved and presented by the content player.

However, it is presently recognized that, for both DASH and HLS, manifests can include a significant amount of repetitious information, causing the manifest files to be large and extensive. These manifests can be cumbersome for the content player to download and parse, resulting in undesirable delays when beginning playback of requested content, additional energy and/or computing resource consumption, and/or playback errors. As such, there exists a need to improve performance, efficiency, and stability relative to existing streaming protocols.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment of the present disclosure, a playback device includes at least one memory configured to store a content player and at least one processor configured to execute stored instructions of the content player to perform actions. The actions include receiving a manifest associated with content and parsing the manifest to ingest a set of objects defining parameters of the content. The actions include selecting an audio segment of the content, a video segment of the content, or a combination thereof. The actions include determining a local audio segment information object associated with the selected audio segment, or a local video segment information object associated with the selected video segment, or a combination thereof. The actions include determining, from the ingested set of objects, at least one global object associated with the local audio segment information object or associated with the local video segment information object. The actions include presenting for playback the audio segment or the video segment by utilizing parameters defined by the at least one global object.

In accordance with an embodiment of the present disclosure, a method includes receiving a manifest associated with content and parsing the manifest to ingest a set of objects defining parameters of the content. The method includes selecting an audio segment of the content, a video segment of the content, or a combination thereof. The method includes determining a local audio segment information object associated with the selected audio segment, or a local video segment information object associated with the selected video segment, or a combination thereof. The method includes determining, from the ingested set of objects, at least one global object associated with the local audio segment information object or associated with the local video segment information object. The method includes presenting for playback the audio segment or the video segment by utilizing parameters defined by the at least one global object.

In accordance with an embodiment of the present disclosure, a method includes parsing a Dynamic Adaptive Streaming over HTTP (DASH) or HTTP Live Streaming (HLS) manifest associated with content to ingest objects respectively associated with audio segments of the content, video segments of the content, or a combination thereof. The method includes identifying, within the ingested objects, at least one parameter that is redundantly defined for more than one of the audio segments or more than one of the video segments. The method includes generating, in a schema, a global object defining the at least one parameter along with a corresponding unique identifier of the global object. The method includes generating, in the schema, at least one local object defining an identifier parameter that references the global object using the corresponding unique identifier of the global object. The method includes outputting the schema as a manifest for the content.

In accordance with an embodiment of the present disclosure, a non-transitory, computer-readable medium stores instructions executable by a processor of a computing device. The instructions include instructions to parse a Dynamic Adaptive Streaming over HTTP (DASH) or HTTP Live Streaming (HLS) manifest associated with content to ingest objects respectively associated with audio segments of the content, video segments of the content, or a combination thereof. The instructions include instructions to identify, within the ingested objects, at least one parameter that is redundantly defined for more than one of the audio segments or more than one of the video segments. The instructions include instructions to generate, in a schema, a global object defining the at least one parameter along with a corresponding unique identifier of the global object. The instructions include instructions to generate, in the schema, at least one local object defining an identifier parameter that references the global object using the corresponding unique identifier of the global object. The instructions include instructions to output the schema as a manifest for the content.

In accordance with an embodiment of the present disclosure, a device includes a memory and at least one processor coupled to the memory. The processor is configured to execute a modified streaming encoder on content to generate audio segments of the content, video segments of the content, or a combination thereof, from a source file. The processor is configured to generate a manifest for the content based on information determined during execution of the modified streaming encoder. The manifest includes a global object defining at least one parameter along with a corresponding unique identifier of the global object, and includes at least one local object defining an identifier parameter that references the global object using the corresponding unique identifier of the global object.

In accordance with an embodiment of the present disclosure, a method includes executing a modified streaming encoder on content to generate audio segments of the content, video segments of the content, or a combination thereof, from a source file. The method includes generating a manifest for the content based on information determined during execution of the modified streaming encoder. The manifest includes a global object defining at least one parameter along with a corresponding unique identifier of the global object, and includes at least one local object defining an identifier parameter that references the global object using the corresponding unique identifier of the global object.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a flow diagram illustrating a process in which a streaming content player processes the JSON manifest to facilitate playback of audio/video content, in accordance with embodiments of the present technique;

DETAILED DESCRIPTION

Figure 1:
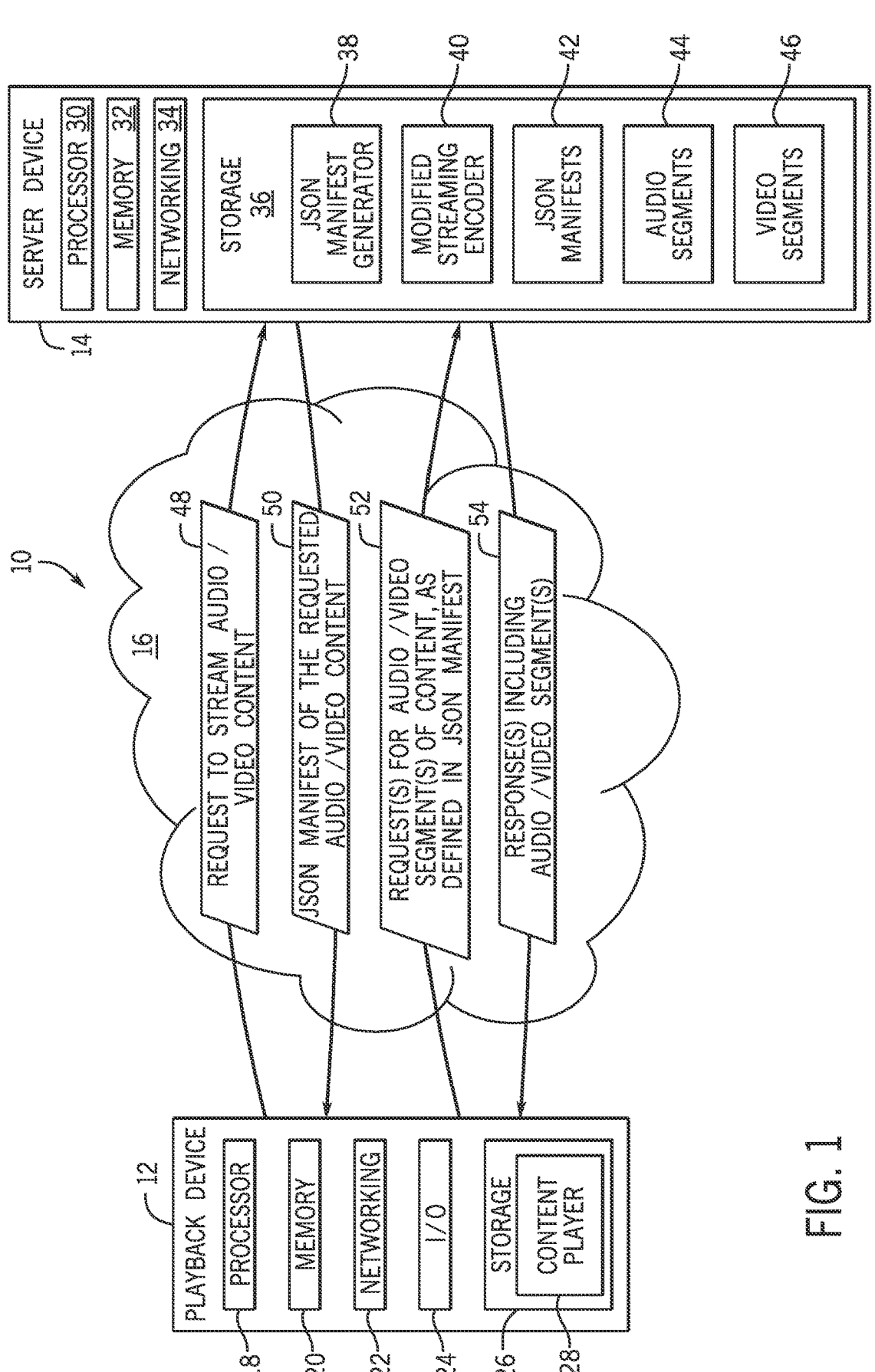
FIG. 1 is a diagram of a streaming media system, in accordance with embodiments of the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "audio/video" is intended to refer to audio, or video, or a combination of audio and video. The term "global" is used herein to refer to an object or parameter of a JSON manifest that can be accessed and used to facilitate the playback of any (e.g., one or multiple) or all of the audio/video segments of the audio/video content. In contrast, the term "local" or "non-global" is used herein to refer to an object or parameter of the JSON manifest that is accessed and used to facilitate the playback of only a particular (or a single) corresponding audio or video segment of the audio/video content.

As noted above, for both DASH and HLS streaming protocols, manifests can be large and extensive due to substantial repetitious information. This can lead to substantial delays in beginning playback of requested audio/video content, inefficiencies with respect to power consumption and computing resource usage of the content player or playback device, and issues with stability of the content player or playback device. In particular, it is presently recognized that DASH and HLS manifests typically include multiple representations of digital rights management (DRM) information, as well as multiple audio and video timelines defined for each video segment and each audio segment of the content. For example, even when it is identical from segment to segment (e.g., across multiple audio segments or multiple video segments), DRM information is typically repeatedly or independently defined in DASH and HLS manifests with respect to each audio/video segment. Furthermore, timeline information is typically repeatedly defined in DASH and HLS manifests for each audio/video segment. This results in substantial duplicative or redundant data that the content player and playback device must download and ingest and process, wasting energy and computing resources, and introducing undesirable delays in downloading and starting playback of the desired content.

With the foregoing in mind, present embodiments are directed to a streaming media system and streaming format that enables improved streaming performance over existing streaming formats (e.g., DASH, HLS) by way of a streamlined manifest and schema. In certain embodiments, the manifest may be a JSON manifest and the schema may be a JSON schema. The following discussion of the JSON manifest is meant to be exemplary, and the foregoing principles and techniques are applicable to other types of manifests, including binary formats. JSON is widely supported across many platforms, and many devices support optimized JSON parsing for enhanced efficiency and performance. Furthermore, while the manifests of other streaming protocols redundantly define certain information (e.g., DRM information, timeline information) for each audio/video segment, the schema of the presently disclosed streaming format includes global objects that define certain unique (e.g., non-redundant, non-duplicative) global parameters that can pertain to any or all of the audio/video segments, along with a corresponding unique identifier to refer to the global object. The schema also includes respective local objects that define local parameters for each of the audio/video segments, including one or more parameters that refer to a global object using the unique identifier of the global object, as opposed to duplicating information of the global object within the audio/video information objects themselves.

In this manner, the manifest of the presently disclosed streaming format demonstrates a substantially smaller file size than corresponding DASH or HLS manifests (e.g., 5× reduction in file size). The manifest of the present approach also demonstrates a substantially faster downloading and processing time compared to DASH or HLS manifests (e.g., 100× decrease in downloading and processing time), with substantially fewer objects being ingested during processing (e.g., 70% fewer objects). As such, the manifest enables a novel streaming format that offers a number of improvements, including reduced delays in beginning playback of requested content, reduced energy utilization, reduced computing resource consumption (e.g., reduced memory utilization, reduced processor utilization), and improved stability.

FIG. 1 is a diagram of an embodiment of streaming media system 10. As illustrated, the streaming media system 10 includes at least one playback device 12 that is communicatively coupled to at least one server device 14 (also referred to herein as simply "server") via suitable network 16. In certain embodiments, the playback device 12 is a desktop computer, a laptop computer, a smart phone, a television, a set-top box, or another suitable computing device. In certain embodiments, the server 14 is a stand-alone server or a virtualized server hosted by a remote or on-premises data center. The network 16 may include a wide-area network (WAN), a local-area network (LAN), a virtual private network (VPN), the Internet, another suitable wired and/or wireless network, or any suitable combination thereof.

For the embodiment illustrated in FIG. 1, the playback device 12 includes at least one processor 18 (e.g., a central processing unit (CPU), a graphic processing unit (GPU)), at least one memory 20 (e.g., random access memory (RAM), read-only memory (ROM)), at least one networking interface 22 (e.g., wired or wireless network interface), at least one input/output (I/O) device 24 (e.g., display, video output port, speakers, audio output port, touchscreen, keyboard, mouse, Bluetooth or infrared (IR) remote control), and at least one storage 26 (e.g., a hard disk drive (HDD), a solid-state disk (SSD), flash memory). It may be appreciated that, in certain embodiments, the playback device 12 may be a television or set-top box having substantially fewer computational resources (e.g., lower power processor 18, smaller/slower memory 20, limited bandwidth or throughput networking interface 22, smaller storage 26) compared to other playback devices, such as a desktop computer. Indeed, in certain cases, the limitations of the computational resources of such playback devices may be by design, for example, to reduce manufacturing cost or to limit the power consumption of the playback device and achieve a particular energy usage rating. It may be appreciated that disclosed technique is especially useful for playback devices with such limitations, as it enables reduced computational resource and/or energy usage relative to other streaming formats.

The storage 26 of the playback device 12 stores suitable applications or apps that are executed by the processor 18 to provide desired functionality at the playback device 12. For example, the storage 26 of the playback device 12 stores a content player 28 that can be loaded into memory 20 and executed by the processor 18 to enable the playback device 12 to stream audio/video content from the server 14. As discussed below, the content player 28 of the playback device 12 is capable of receiving and processing JSON manifests to facilitate the playback of streamed audio/video content on the playback device 12.

For the embodiment illustrated in FIG. 1, the server 14 may include at least one processor 30 (e.g., a CPU, a GPU), at least one memory 32 (e.g., RAM, ROM), at least one networking interface 34 (e.g., wired or wireless network interface), and at least one storage 36 (e.g., a HDD, SSD, flash memory). The storage 36 stores one or more applications that are loaded into the memory 32 and/or executed by the processor 30 to enable different functionality discussed herein. For example, as discussed in detail below with respect to FIGS. 4 and 5, in certain embodiments, the storage 36 of the server 14 stores a JSON manifest generator 38 having instructions that cause the processor 30 to convert the manifests of other streaming formats (e.g., DASH or HLS manifests) into JSON manifests 42. As discussed in detail below with respect to FIG. 6, in certain embodiments, the storage 36 of the server 14 may store a modified streaming encoder 40 having instructions that cause the processor 30 to encode source audio/video content into audio segments 44 and/or video segments 46, and to generate corresponding JSON manifests 42 to facilitate streaming of the content. Although FIG. 1 illustrates both the JSON manifest generator 38 and the modified streaming encoder 40 within the server 14, the server 14 (or another device) may include one without the other. For the illustrated embodiment, in addition to storing the JSON manifests 42 that are generated by the JSON manifest generator 38 or the modified streaming encoder 40, the storage 36 also stores the audio segments 44 and video segments 46 generated by a streaming encoder (e.g., a standard streaming encoder or the modified streaming encoder 40) when encoding the source audio/video content for streaming, as discussed below.

For the embodiment illustrated in FIG. 1, the content player 28 may receive user input (e.g., via the I/O devices 24) requesting the playback of particular audio/video content that is hosted by the server 14 or an affiliated entity (e.g., a content delivery network). In response, the content player 28 of the playback device 12 generates and sends to the server 14, or an intermediary entity, a request 48 to stream particular audio/video content to the player. In response to the request, the server 14, or the intermediary entity, provides a response 50 that includes the JSON manifest of the requested audio/video content. As discussed below, the content player 28 parses the received JSON manifest to ingest a set of objects defining parameters related to downloading, processing, and presenting the audio segments 44 and/or video segments 46 of the requested audio/video content. Using the information gleaned from ingestion of the received JSON manifest, the content player 28 provides one or more requests 52 for the audio segments 44 and/or video segments 46 of the audio/video content, as defined in the JSON manifest. In response to these requests, the server 14 or the affiliated entity (e.g., a content delivery network) provides responses 54 including the requested audio segments 44 and/or video segments 46 of the content. Additionally, using the information gleaned from ingestion of the JSON manifest, the content player 28 presents or plays the received audio segments and/or video segments of the content to the user (e.g., via the I/O devices 24), in accordance with the parameters defined in the JSON manifest.

Figure 2:
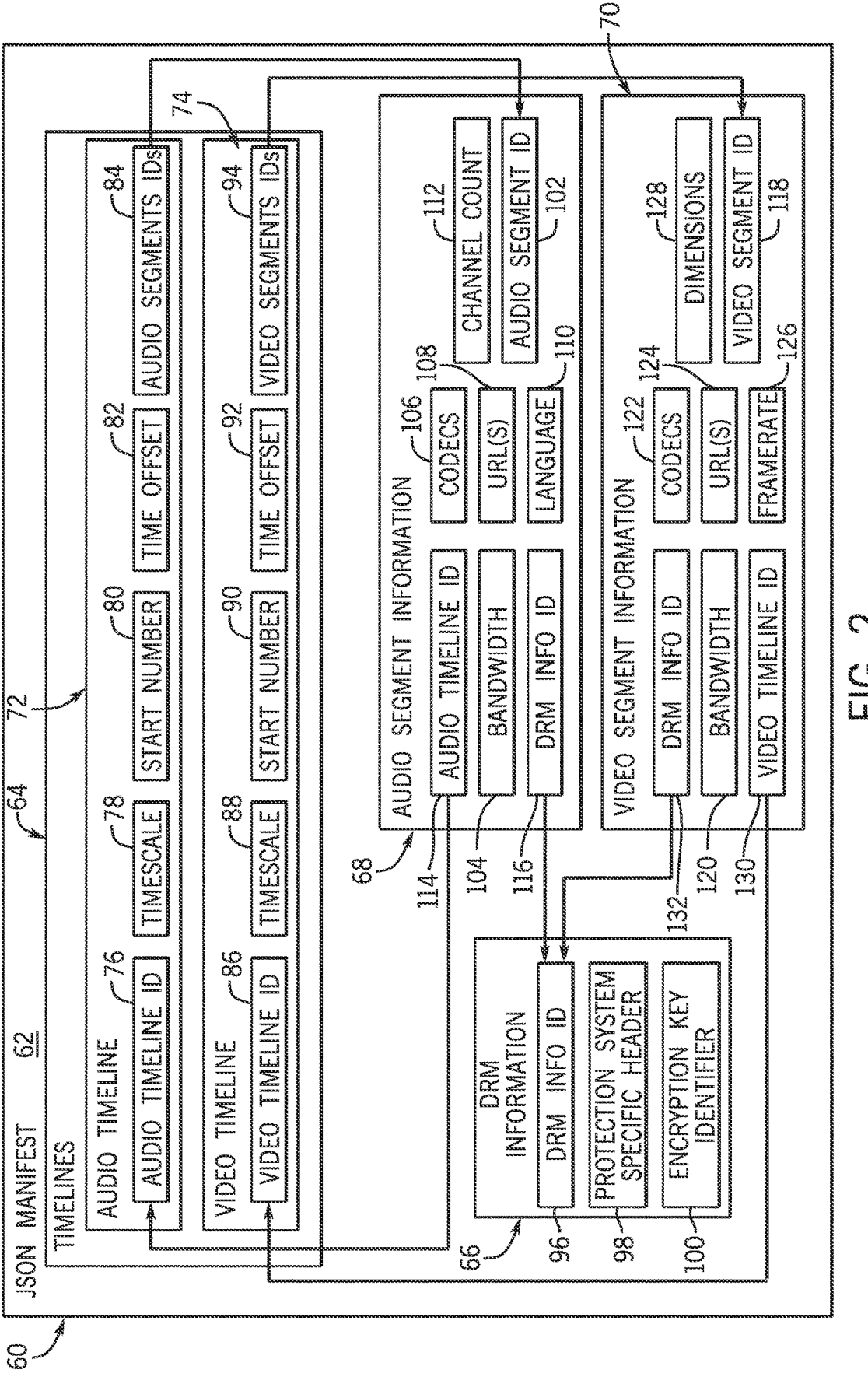
FIG. 2 is a diagram illustrating a JSON schema of an example JSON manifest, in accordance with embodiments of the present technique.

FIG. 2 is a diagram illustrating a schema 60 of an example embodiment of a manifest 62, in accordance with the present technique. For the illustrated embodiment, the manifest 62 is a JSON manifest and the schema 60 is a JSON schema, while in other embodiments, other file formats may be used. The example JSON manifest 62 is associated with and defines parameters for streaming audio/video segments encoded from source audio/video content. As discussed below, in some embodiments, the source audio/video content is first encoded using a standard encoder, such as a DASH encoder, to generate the one or more audio/video segments, as well as a non-JSON manifest, and then the JSON manifest generator 38 converts the non-JSON manifest into the JSON manifest 62. In other embodiments, the source audio/video content is encoded using the modified streaming encoder, which generates the audio/video segments, as well as the JSON manifest 62.

For the embodiment illustrated in FIG. 2, the JSON schema 60 of the JSON manifest 62 includes one or more global timeline objects 64 and one or more global DRM information objects 66. These global objects define global parameter information that can be accessed and used during the playback of any or all of the audio/video segments of the audio/video content. For example, a global timeline object may indicate a timelineId with a value of 1, a timescale value, a start number value, a vector of segments, and a presentation time offset. Another global timeline object with a different timelineId value (e.g., value of 2) may have different values with respect to the timescale, the start number, the vector of segments, and/or the presentation time offset. Similarly, a global DRM information object may indicate a drmInfoId with a value of 1 that corresponds to a particular DRM license. Another global DRM information object with a different drmInfoId value may have information corresponding to a different DRM license that the global DRM information object with a drmInfoId value of 1. In other words, the value of the timelineId and drmInfoId may be unique to their respective information with the object. When parsing the JSON manifest 62, the content player 28 may look up the timeline information corresponding to a global timeline object with a timelineId with value 1. Similarly, the content player 28 may look up DRM information corresponding to a global DRM information object with drmInfoId with value 1. It may be appreciated that, in other embodiments, the JSON schema 60 may define other global objects storing other global parameter information (e.g., adaptation information, resolution information, high dynamic range (HDR)/standard dynamic range (SDR) information, advertisement information) that can be accessed and used to facilitate the playback of any or all of the audio/video segments of the associated audio/video content. The JSON schema 60 also defines one or more local audio segment information objects 68 and/or one or more local video segment information objects 70, including a respective local audio segment information object for each audio segment of the audio/video content, and a respective local video segment information object for each video segment of the audio/video content. The local audio/video segment information objects define local or non-global parameter information that is accessed and used only during the playback the particular corresponding audio/video segment of the audio/video content.

As noted above, DASH and HLS manifests include a substantial amount of redundant information that detrimentally results in increased file size, increased downloading and parsing time, and has increased a number of objects ingested during parsing. It is presently recognized that a substantial portion of the redundant information of DASH and HLS manifests results from certain parameters or sets of parameters (e.g., DRM information, timelines) being separately defined within each audio segment information section and each video segment information section of the manifest, even when the parameter names and values are identically defined within each of these sections. In contrast, in present embodiments, the JSON schema 60 of the JSON manifest 62 enables a substantial reduction in redundant data using the global objects and their corresponding unique identifiers. For example, in the context where a standard encoder is used to generate a non-JSON manifest (see FIG. 4), rather than defining identical local parameter information with respect to each local audio segment information object and/or each local video segment information object, in the JSON schema 60, certain duplicative parameter information is instead replaced by a global identifier, wherein the global identifier (e.g., timelineId or drmInfoId) is assigned a unique value. Additionally, audio segment information within a DASH or HLS manifest would have portions of the local audio segment information object replaced by a corresponding one or more global identifiers (e.g., timelineId or drmInfold), and video segment information within a DASH or HLS manifest would have portions of the local video segment information object replaced by a corresponding one or more global identifiers (e.g., timelineId or drmInfoId). Each global identifier is defined to include at least one parameter (e.g., an identifier parameter) having a value that corresponds and refers to a global object within the JSON schema 60, which enables the content player 28 to retrieve the desired parameter information from the definition of the referenced global object. As such, the JSON manifest 62 demonstrates a substantial reduction in file size, a substantial reduction in downloading and parsing time, and a substantial reduction in the number of objects ingested, as compared to DASH or HLS manifests.

For the embodiment illustrated in FIG. 2, the global timeline objects 64 of the JSON schema 60 include one or more global audio timeline objects 72 and one or more global video timeline objects 74. Each of the global audio timeline objects 72 defines a number of global parameters, including: a respective audio timeline identifier 76 (e.g., timelineId) uniquely identifying the audio timeline object, a respective timescale parameter 78 that defines (e.g., in milliseconds) the length or duration of the audio segments associated with the audio timeline object, a respective start number parameter 80 that defines the number or audio segment at which the playback begins, a respective time offset parameter 82 that defines whether the audio segments associated with the audio timeline object are to be temporally shifted during playback, and a respective array of audio segment identifiers 84 indicating the audio segments that are associated with the audio timeline object. For example, in certain embodiments, the array of audio segment identifiers 84 may be an array storing a set of audio segment identifiers, wherein each audio segment identifier uniquely refers to a corresponding local audio segment information object of the local audio segment information objects 68.

Each of the global video timeline objects 74 defines a number of global parameters, including: a respective video timeline identifier 86 (e.g., timelineId) uniquely identifying the video timeline object, a respective timescale parameter 88 that defines (e.g., in milliseconds) the length or duration of the video segments associated with the video timeline object, a respective start number parameter 90 that defines the number or video segment at which the playback begins, a respective time offset parameter 92 that defines whether the video segments associated with the video timeline object are to be temporally shifted during playback, and a respective array of video segment identifiers 94 indicating the video segments that are associated with the video timeline object. For example, in certain embodiments, the array of video segment identifiers 94 may be an array storing a set of video segment identifiers, wherein each video segment identifier uniquely refers to a corresponding local video segment information object of the local video segment information objects 70. It may also be appreciated that the content player 28 can also infer additional parameter information based on the parameters and values defined in the JSON schema 60, such as determining a frame rate of a video segment based on the timescale parameter (e.g., a timescale of 24000 results in a 24 frames per second (fps) framerate).

For the embodiment illustrated in FIG. 2, each of the global DRM information objects 66 of the JSON schema 60 defines global DRM information associated with one or more of the audio/video segments of the audio/video content. Each of the global DRM information objects 66 define a number of global parameters, including a respective DRM information identifier 96 that uniquely identifies the DRM information object, as well as a respective protection system specific header (PSSH) parameter 98 and a respective encryption key identifier parameter 100 (KID) that define suitable values used by an example DRM technique. It may be appreciated that, in other embodiments, any other suitable DRM parameters may be defined within the global DRM information objects 66, in accordance with the present disclosure.

For the embodiment illustrated in FIG. 2, each of the local audio segment information objects 68 of the JSON schema 60 defines respective local parameters of an associated audio segment of the audio/video content. These local parameters include a respective audio segment identifier 102 that uniquely identifies the audio segment information object within the schema, a respective bandwidth parameter 104 that defines the bandwidth of the associated audio segment, a respective codecs parameter 106 that defines the codec used to encode and decode the associated audio segment, one or more respective uniform resource locator (URL) parameters 108 that define a location of the associated audio segment or other resources (e.g., templates), a respective language parameter 110 defining a language of the associated audio segment, a respective channel count parameter 112 that defines the number of audio channels of the associated audio segment. The local parameters also include a respective audio timeline identifier 114 that uniquely refers to the audio timeline identifier 76 of a global audio timeline object that corresponds to the associated audio segment, as well as a respective DRM information identifier 116 that uniquely refers to the DRM information identifier 96 of a global DRM information object that corresponds to the associated audio segment.

For the embodiment illustrated in FIG. 2, each of the local video segment information objects 70 of the JSON schema 60 defines respective local parameters of an associated video segment of the audio/video content. These local parameters include a respective video segment identifier 118 that uniquely identifies the video segment information object within the schema, a respective bandwidth parameter 120 that defines the bandwidth of the associated video segment, a respective codecs parameter 122 that defines the codec used to encode and decode the associated video segment, one or more respective URL parameters 124 that define a location of the associated video segment or other resources (e.g., templates), a respective framerate parameter 126 defining a framerate of the associated video segment, a respective dimensions parameter 128 that defines the vertical and horizontal dimensions of the associated video segment. The local parameters also include a respective video timeline identifier 130 that uniquely refers to the video timeline identifier 86 of a global video timeline object that corresponds to the associated video segment, as well as a respective DRM information identifier 132 that uniquely refers to the DRM information identifier 96 of a global DRM information object that corresponds to the associated video segment.

FIG. 3 is a flow diagram illustrating an embodiment of a process 140 in which the content player 28 of the playback device 12 processes a JSON manifest to facilitate playback of audio/video content. The process 140 is discussed with reference to elements illustrated in FIGS. 1 and 2. The process 140 may be stored as instructions in the storage 26 and/or memory 20 and executed by the processor 18 of the playback device 12. In other embodiments, the process 140 may include additional actions, fewer actions, repeated actions, actions performed in a different sequence, and so forth, in accordance with the present disclosure.

For the embodiment illustrated in FIG. 3, the process 140 begins with the processor 18 receiving (block 142) input (e.g., via the I/O devices 24) indicating that the user of the playback device desires to stream audio/video content. In response, the processor 18 requests and receives (block 144), from the server 14, a JSON manifest for the audio/video content. The processor 18 then parses the received JSON manifest to ingest a set of objects (e.g., JavaScript objects) defining parameters associated with the downloading, processing, and presenting the audio/video content (block 146). As discussed with respect to FIG. 2, in some embodiments, the ingested objects include global audio timeline objects, global video timeline objects, global DRM information objects, local audio segment information objects, and/or local video segment information objects, or a combination thereof.

For the embodiment illustrated in FIG. 3, the process 140 continues with the processor 18 selecting (block 148) a local audio segment information object, a local video segment information objection, or a combination thereof.

The processor 18 determines (block 150), from the selected object, at least one global object related to the local audio segment information object and/or related to the local video segment information object. For example, the processor 18 may determine, within the set of objects ingested from the JSON manifest, a global DRM information object referenced by the local audio segment information object or referenced by the local video segment information object. To do so, the processor 18 may determine the DRM information identifier 116 from the local audio segment information object, and/or the DRM information identifier 132 from the local video segment information object, and use this DRM information identifier to retrieve one or more corresponding global DRM information objects from the ingested set of objects.

Similarly, the processor 18 (block 150) may determine a global audio timeline object based on the audio timeline identifier included in the local audio segment information object and/or a global video timeline object based on the video timeline identifier included in the local video segment information object. Based on the determined global audio timeline object or the global video timeline object, the processor 18 may then (block 152) select a first audio segment associated with the global audio timeline object based on the respective start number parameter 80 and the respective array of audio segment identifiers 84 associated with the global audio timeline object, or select a first video segment associated with the global video timeline object based on the respective start number parameter 90 and the respective array of video segment identifiers 94 associated with the selected global video timeline object, or both.

For the embodiment illustrated in FIG. 3, the process 140 continues with the processor 18 utilizing (block 154) parameters defined by the at least one global object, and by one or both of the local audio segment information object and the video segment information object, to retrieve, process, and present the selected audio segment, or the selected video segment, or a combination thereof. For example, this may include using the DRM information defined by a related global DRM information object to process the selected audio segment or the selected video segment for presentation. As indicated by the arrow 156, the processor 18 then returns to block 148, to select the next local audio segment information object and the next local video segment information objection (e.g., as indicated by an audio timeline object and/or a video timeline object), and then repeats the actions of blocks 150, 152, and 154 until playback of the audio/video content is completed or terminated by the user.

Figure 4:
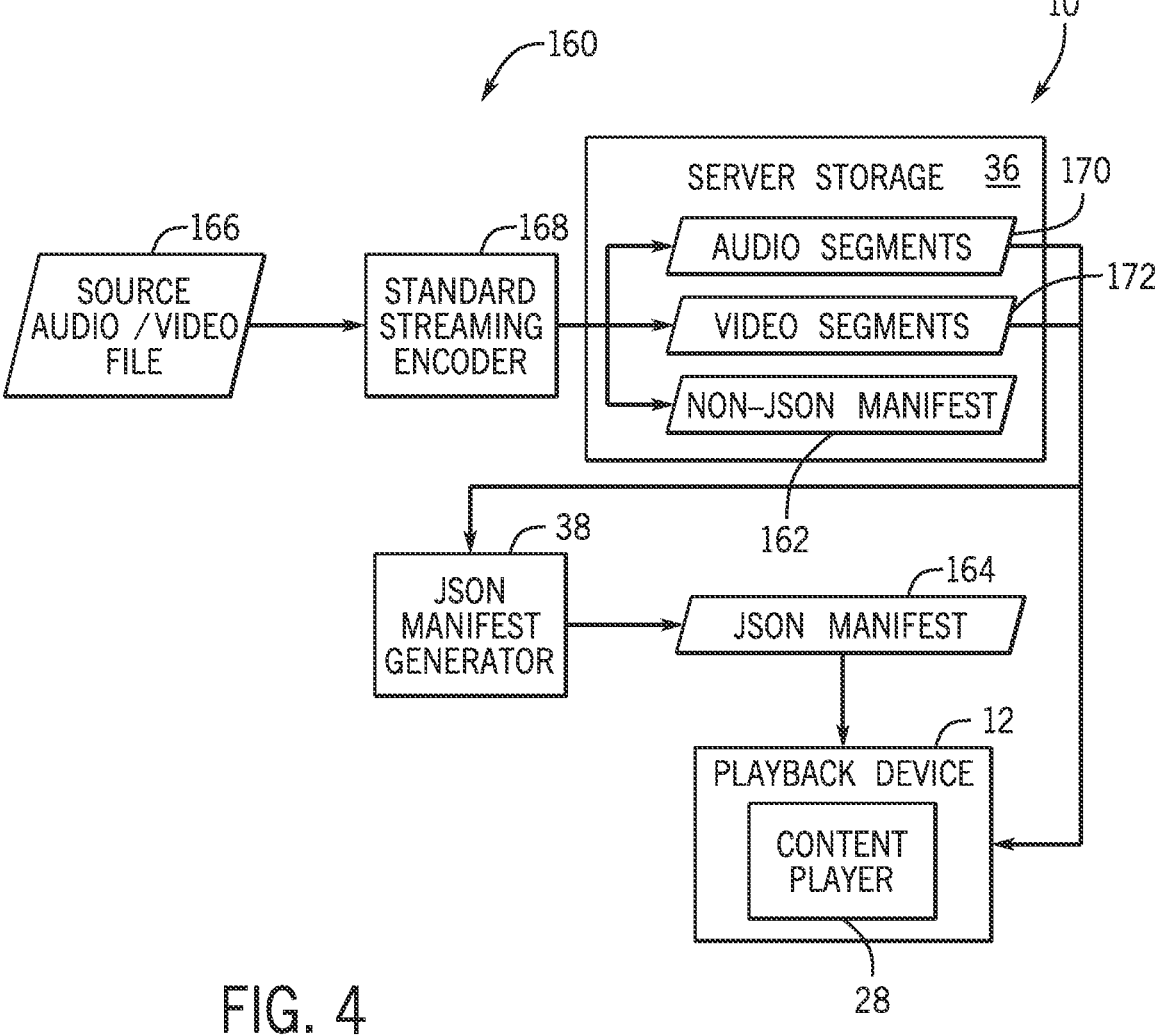
FIG. 4 is a diagram illustrating a hybrid implementation of the streaming media system in which audio/video content can be streamed to a playback device using a non-JSON manifest or using a JSON manifest that is generated from the non-JSON manifest, in accordance with embodiments of the present technique.

FIG. 4 is a diagram illustrating an embodiment of a hybrid implementation 160 of the streaming media system 10. For the hybrid implementation 160 of FIG. 4, audio/video content may be streamed to the playback device 12 using a non-JSON manifest 162 (e.g., DASH manifests, HLS manifests) or using a JSON manifest 164 that is generated from the non-JSON manifest 162, which enables enhanced flexibility. To prepare audio/video content for streaming, a source audio/video file 166 is provided as input to a standard streaming encoder 168, such as a Moving Picture Expert Group (MPEG) DASH encoder. The standard streaming encoder 168 includes computer-implemented instructions to translate the source audio/video file 166 into a set of audio segments 170 and a set of video segments 172, as well as at least one non-JSON manifest 162, all of which are suitably saved to the storage 36. At this point, a content player 28 is capable of downloading the non-JSON manifest 162 and playing back the audio segments 170 and the video segments 172 of the content, in accordance with the corresponding protocol (e.g., DASH, HLS).

For the embodiment illustrated in FIG. 4, the illustrated content player 28 of the playback device 12 may be configured to preferentially or only request the JSON manifest 164 for the audio/video content in order to realize the benefits of the JSON manifest set forth above. In certain embodiments, the JSON manifest generator 38 may be automatically executed to process the non-JSON manifest 162 in response to the non-JSON manifest 162 being created or modified, and the resulting JSON manifest 164 may be stored within the storage 36 for retrieval by the playback device 12. In other embodiments, the JSON manifest generator 38 may instead be executed to process the non-JSON manifest 162 in an on-demand manner, and provide the resulting JSON manifest 164 to the playback device 12 in response to the playback device 12 requesting streaming of the audio/video content.

Figure 5:
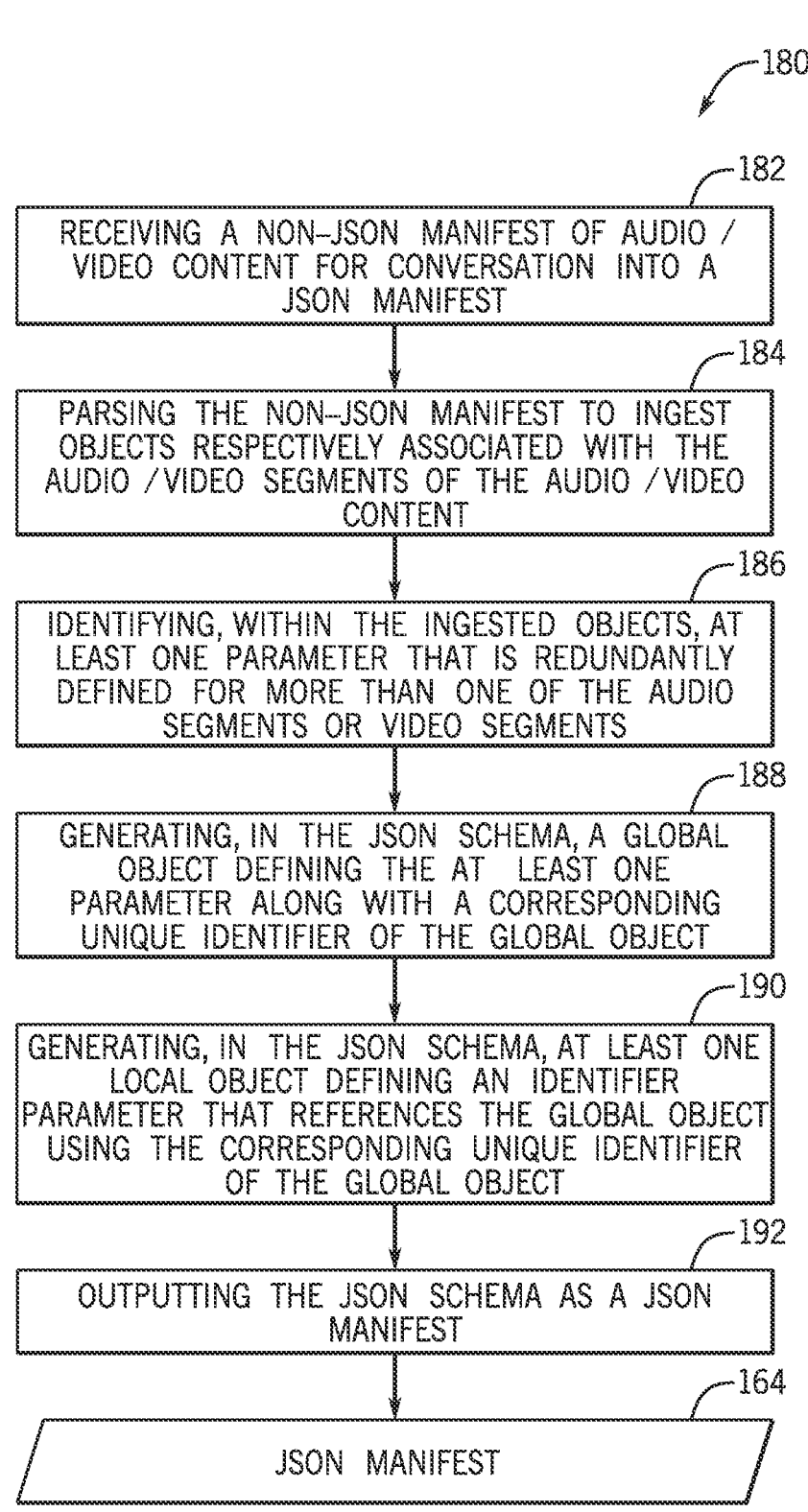
FIG. 5 is a flow diagram illustrating a process by which a JSON manifest generator processes and converts a non-JSON manifest into a JSON manifest, in accordance with embodiments of the present technique.

FIG. 5 is a flow diagram illustrating an embodiment of a process 180 by which the JSON manifest generator 38 processes and converts a non-JSON manifest 162 (e.g., DASH manifests, HLS manifests) into the JSON manifest 164. The process 180 is discussed with reference to elements illustrated in FIGS. 1, 2, and 4. The process 180 may be stored as instructions in the storage 36 and/or memory 32, and executed by the processor 30 of the server 14. In other embodiments, the process 180 may include additional actions, fewer actions, repeated actions, actions performed in a different sequence, and so forth, in accordance with the present disclosure.

For the embodiment illustrated in FIG. 5, the process 180 begins with the processor 30 receiving (block 182) the non-JSON manifest 162 of the audio/video content for conversion into the JSON manifest 164. The processor 30 then parses (block 184) the non-JSON manifest 162 to ingest objects defining parameters (e.g., DRM information, timeline information, etc.) of each audio segment and each video segment of the audio/video content. The processor 30 continues by identifying (block 186), within the ingested objects, at least one parameter that is redundantly defined for more than one of the audio segments or video segments. For example, as discussed above, the processor 30 may determine that the parameters of the ingested objects define the same DRM information and/or the same timeline information for more than one of the audio or video segments of the audio/video content. In certain embodiments, the JSON manifest generator 38 may apply artificial intelligence (AI) models or rules-based techniques to automatically identify redundant parameters within the ingested objects.

For the embodiment illustrated in FIG. 5, the process 180 continues with the processor 30 generating (block 188), in the JSON schema 60, a global object defining the at least one parameter identified in block 186, along with a corresponding unique identifier of the global object. In certain embodiments, the processor 30 generates multiple global objects, each defining at least one of the parameters identified in block 186, along with a respective unique identifier. The processor 30 also generates (block 190), in the JSON schema 60, at least one local object (e.g., a local audio segment information object, a local video segment information object) defining an identifier parameter (e.g., a DRM information identifier, a timeline identifier) that references the global object generated in block 188 using the corresponding unique identifier of the global object. In certain embodiments, the processor 30 generates multiple local objects that respectively reference one or more global objects using the corresponding unique identifier of the global objects. The processor 30 generally keeps track of the unique identifiers and their respective relationships with the unique identifiers as they are generated to ensure that each unique identifier refers to only one global object, and that there are not multiple identifiers that refer to the same global object. The process 180 concludes with the processor 30 outputting (block 192) the JSON schema 60 as the JSON manifest 164 of the audio/video content, wherein the JSON objects and parameters defined within the JSON schema 60 are written to a file and stored within the storage 36 of the server 14, or provided directly to the playback device 12 in response to receiving a request to stream the audio/video content.

In an example related to DRM information, in block 184, the processor 30 extracts the respective DRM information of each of the audio/video segments from the non-JSON manifest 162, wherein certain audio/video segments share the same DRM information (e.g., same PSSH and KID values). In block 186, the processor 30 identifies this redundant DRM information. Then, in block 188, the processor 30 eliminates this redundancy by generating, in the JSON schema 60, respective global DRM information objects for each unique set of DRM information (e.g., each unique PSSH 98 and KID 100), and defining a corresponding unique identifier (e.g., DRM information identifier 96) to refer to each of these global DRM objects. Then, in block 190, the processor 30 generates, in the JSON schema 60, a respective DRM information identifier parameter 116 for each local audio segment information object, and a respective DRM information identifier parameter 132 for each local video segment information object, and sets appropriate values to these parameters to refer to the corresponding global DRM information object. In an aspect, for each local audio segment information object, the DRM information (e.g., PSSH 98 and KID 100) is replaced by the DRM information identifier parameter 116 that references a global DRM information object containing the DRM information.

In another example related to timeline information, in block 184, the processor 30 extracts the respective timeline information of each of the audio/video segments from the non-JSON manifest 162, wherein certain audio/video segments share the same timeline information (e.g., same set of timescale, start number, time offset values, audio/video segments). In block 186, the processor 30 identifies this redundant timeline information. Then, in block 188, the processor 30 eliminates the redundancy by generating, in the JSON schema 60, respective global timeline objects for each unique set of timeline information (e.g., each unique set of timescale, start number, time offset values, audio/video segments), and defining a corresponding unique identifier (e.g., audio timeline identifier 76, video timeline identifier 86) to refer to each of these global timeline objects. Then, in block 190, the processor 30 generates, in the JSON schema, a respective audio timeline identifier parameter 114 for each local audio segment information object, and a respective video timeline identifier parameter 130 for each local video segment information object, and sets appropriate values to these parameters to refer to the corresponding global timeline object.

Figure 6:
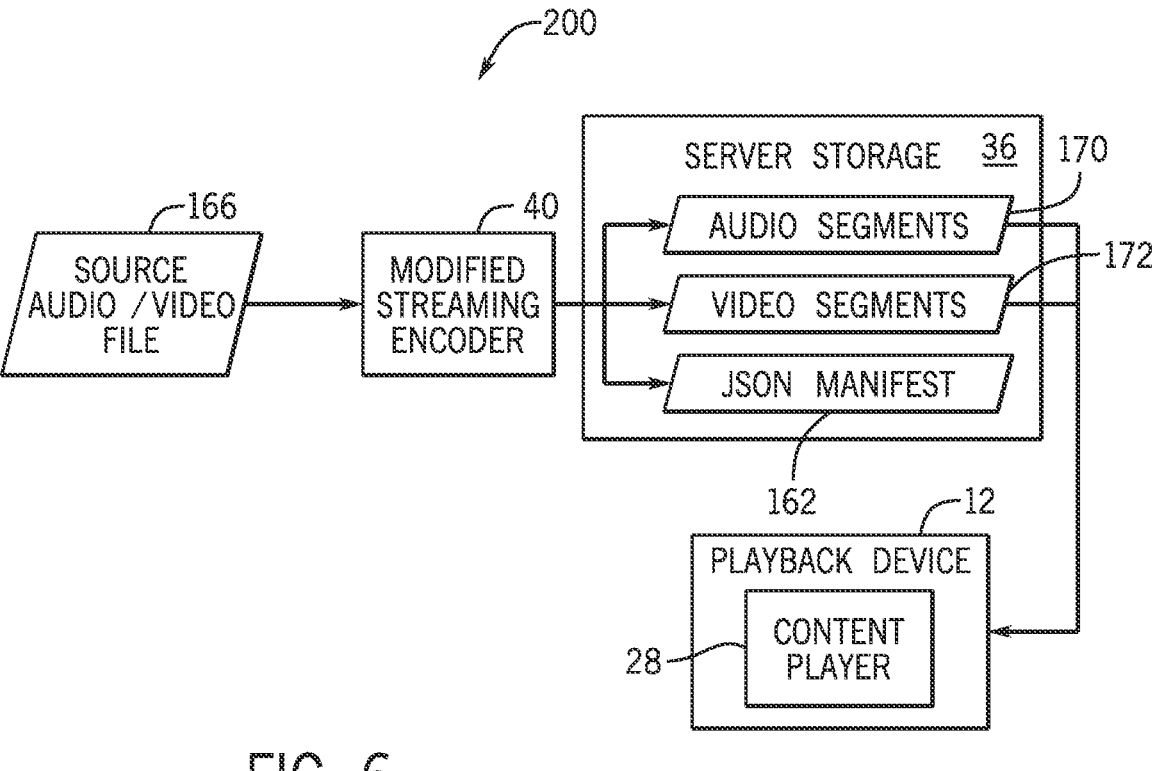
FIG. 6 is a diagram illustrating an implementation of the streaming media system in which audio/video content is streamed to the playback device using a JSON manifest that is generated during encoding of the audio/video content, in accordance with embodiments of the present technique.

FIG. 6 is a diagram illustrating an embodiment of an alternative implementation 200 of the streaming media system 10, in which audio/video content is streamed to the playback device 12 using a JSON manifest 164 that is generated during encoding. To prepare audio/video content for streaming, the source audio/video file 166 is provided as input to the modified streaming encoder 40. The modified streaming encoder 40 includes computer-implemented instructions to translate the source audio/video file 166 into a set of audio segments 170 and a set of video segments 172, and to generate the JSON manifest 164, which are all suitably saved to the storage 36. As the JSON manifest 164 is generated, the modified streaming encoder 40 generates respective global objects that store each unique set of timeline and DRM information and/or other repetitious information. The modified streaming encoder 40 keeps track of the respective relationships with the associated identifiers in order to avoid having multiple identifiers refer to the same global object. The modified streaming encoder 40 also generate local audio segment information objects and local video segment information objects. The local audio segment information objects and local video segment information objects may include one or more global object identifiers (e.g., DRM information identifiers, timeline information identifiers) that refer to their respective global objects. At this point, the content player 28 is capable of downloading the JSON manifest 164 and playing back the audio segments 170 and/or video segments 172 of the content in accordance with the JSON manifest 164, as discussed above with respect to FIGS. 1 and 2. As such, in contrast to the hybrid implementation 160 of FIG. 4, the alternative implementation 200 of FIG. 6 does not involve the translation of manifests of other streaming protocols (e.g., DASH, HLS). However, the aforementioned benefits of the JSON manifest 164 (e.g., smaller manifest file size, less or no redundant information, fewer objects to ingest, etc.) are afforded to the content player 28 of the playback device 12 during playback of the audio/video content.

The technical effects of the present disclosure include a streaming media system and streaming format that enable improved streaming performance over existing streaming formats (e.g., DASH, HLS) through the use of a streamlined manifest having a streamlined schema. While the manifests of other streaming protocols redundantly define certain information (e.g., DRM information, timeline information) for each audio/video segment, the schema includes global objects that define certain unique (e.g., non-redundant, non-duplicative) global parameters that can pertain to any or all of the audio/video segments, along with a corresponding unique identifier to refer to each global object. The schema also includes respective local audio/video information objects that define local parameters for each of the audio/video segments, including one or more local parameters that refer to a global object using the unique identifier of the global object, as opposed to duplicating information of the global object within the audio/video information objects themselves. As such, the disclosed manifest demonstrates a substantially smaller file size than corresponding DASH or HLS manifests (e.g., 5× reduction in file size). The disclosed manifest also demonstrates a substantially faster download-ing and processing time compared to DASH or HLS mani-fests (e.g., 100× decrease in downloading and processing time), with substantially fewer objects being ingested during processing (e.g., 70% fewer objects). As such, the disclosed manifest enables a novel streaming format that offers a number of improvements, including reduced delays in beginning playback of requested content, reduced energy utilization, reduced computing resource consumption (e.g., reduced memory utilization, reduced processor utilization), and improved stability.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are refer-enced and applied to material objects and concrete examples of a practical nature that demonstrably improve the present technical field and, as such, are not abstract, intangible or purely theoretical. Further, if any claims appended to the end of this specification contain one or more elements desig-nated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A playback device, comprising:

at least one memory configured to store a content player; and at least one processor configured to execute stored instructions of the content player to perform actions comprising:

receiving a manifest associated with content, the mani-fest indicating audio/video segments of content to be played by the content player;

parsing the manifest to ingest a set of objects defining parameters of the content;

selecting a local audio segment information object from the set of objects, or a local video segment informa-tion object from the set of objects, or a combination thereof;

determining, at least one global object wherein the global object defines at least one parameter that is shared among a plurality of the audio/video segments along with a corresponding unique identifier of the global object associated with the selected local audio segment information object or associated with the selected local video segment information object via the unique identifier in the manifest;

selecting an audio segment of the content, a video segment of the content, or a combination thereof based on the determined at least one global object; and presenting for playback the audio segment or the video segment by utilizing parameters defined by the at least one global object.

2. The playback device of claim 1, wherein the at least one processor is configured to determine the parameters defined by the at least one global object by:

determining, from the local audio segment information object or the local video segment information object, a digital rights management (DRM) information identifier;

determining, from the ingested set of objects, a global DRM information object associated with the DRM information identifier; and utilizing the parameters defined by the global DRM information object to process the selected audio segment, or the selected video segment, or a combination thereof, for playback.

3. The playback device of claim 2, wherein the global DRM information object comprises:

the DRM information identifier;

a protection system specific header (PSSH); and an encryption key identifier (KID).

4. The playback device of claim 1, wherein the at least one processor is configured to select the audio segment or the video segment of the content by:

determining a global audio timeline object, or a global video timeline object, or a combination thereof, from the ingested set of objects; and selecting an audio segment identifier from a first array of audio segment identifiers of the global audio timeline object, or selecting a video segment identifier from a second array of video segment identifiers of the global video timeline object, or a combination thereof.

5. The playback device of claim 4, wherein the global audio timeline object comprises:

an audio timeline identifier that uniquely identifies the global audio timeline object; and an array of audio segment identifiers, wherein each of the audio segment identifiers is associated with a respective local audio segment information object.

6. The playback device of claim 4, wherein the global video timeline object comprises:

a video timeline identifier that uniquely identifies the global video timeline object; and an array of video segment identifiers, wherein each of the video segment identifiers is associated with a respective local video segment information object.

7. The playback device of claim 1, wherein the local audio segment information object comprises:

an audio segment identifier that uniquely identifies the local audio segment information object;

a DRM information identifier that refers to a global DRM information object that is associated with the local audio segment information object; and an audio timeline identifier that refers to a global audio timeline object that is associated with the local audio segment information object.

8. The playback device of claim 1, wherein the manifest is a JavaScript Object Notation (JSON) manifest.

9. The playback device of claim 1, wherein the local video segment information object comprises:

a video segment identifier that uniquely identifies the local video segment information object;

a DRM information identifier that refers to a global DRM information object that is associated with the local video segment information object; and a video timeline identifier that refers to a global video timeline object that is associated with the local video segment information object.

10. A method, comprising:

receiving a manifest associated with content, the manifest indicating audio/video segments of content;

parsing the manifest to ingest a set of objects defining parameters of the content;

selecting a local audio segment information object from the set of objects, or a local video segment information object from the set of objects, or a combination thereof, determining at least one global object wherein the global object defines at least one parameter that is shared among a plurality of the audio/video segments along with a corresponding unique identifier of the global object associated with the selected local audio segment information object or associated with the selected local video segment information object via the unique identifier in the manifest;

selecting an audio segment of the content, a video segment of the content, or a combination thereof based on the determined at least one global object; and presenting for playback the audio segment or the video segment by utilizing parameters defined by the at least one global object.

11. The method of claim 10, comprising:

determining, from the local audio segment information object or the local video segment information object, a digital rights management (DRM) information identifier;

determining, from the ingested set of objects, a global DRM information object associated with the DRM information identifier; and utilizing the parameters defined by the global DRM information object to process the selected audio segment, or the selected video segment, or a combination thereof, for playback.

12. The method of claim 10, wherein selecting the audio segment or the video segment of the content comprises:

determining a global audio timeline object, or a global video timeline object, or a combination thereof, from the ingested set of objects; and selecting an audio segment identifier from a first array of audio segment identifiers of the global audio timeline object, or selecting a video segment identifier from a second array of video segment identifiers of the global video timeline object, or a combination thereof.

13. The method of claim 10, wherein the manifest is a JavaScript Object Notation (JSON) manifest.

14. The method of claim 10, wherein the local video segment information object comprises:

a video segment identifier that uniquely identifies the local video segment information object;

a DRM information identifier that refers to a global DRM information object that is associated with the local video segment information object; and a video timeline identifier that refers to a global video timeline object that is associated with the local video segment information object.

15. A method, comprising:

parsing a Dynamic Adaptive Streaming over HTTP (DASH) or HTTP Live Streaming (HLS) manifest associated with content to ingest objects respectively associated with audio segments of the content, video segments of the content, or a combination thereof;

identifying, within the ingested objects, at least one parameter that is redundantly defined for more than one of the audio segments or more than one of the video segments;

generating, in a schema, a global object defining the at least one parameter that is shared among a plurality of the audio segments of the content, the video segments of the content, or the combination thereof, along with a corresponding unique identifier of the global object;

generating, in the schema, at least one local object defining an identifier parameter that references the global object using the corresponding unique identifier of the global object; and outputting the schema as a manifest for the content.

16. The method of claim 15, wherein the manifest is a JavaScript Object Notation (JSON) manifest.

17. The method of claim 15, wherein, prior to parsing, executing a streaming encoder on a source file of the content to generate the audio segments of the content, the video segments of the content, and either the DASH or HLS manifest of the content.

18. The method of claim 15, wherein generating the global object comprises:

generating, in the schema, a plurality of global objects and a plurality of corresponding unique identifiers, wherein relationships between the plurality of global objects and the plurality of corresponding unique identifiers are tracked to ensure that, within the schema, each of the plurality of corresponding unique identifiers refers to only one of the plurality of global objects.

19. The method of claim 18, wherein the plurality of global objects comprises one or more global timeline objects, one or more global digital rights management (DRM) objects, or a combination thereof, and wherein the plurality of corresponding unique identifiers comprises one or more audio timeline identifiers, one or more video timeline identifiers, one or more DRM information identifiers, or a combination thereof.

20. A non-transitory, computer-readable medium storing instructions executable by a processor of a computing device, the instructions comprising instructions to:

parse a Dynamic Adaptive Streaming over HTTP (DASH) or HTTP Live Streaming (HLS) manifest associated with content to ingest objects respectively associated with audio segments of the content, video segments of the content, or a combination thereof;

identify, within the ingested objects, at least one parameter that is redundantly defined for more than one of the audio segments or more than one of the video segments, or both;

generate, in a schema, a common global object to be associated with the more than one of the audio segments or the more than one of the video segments, defining the at least one parameter that is redundantly defined for the more than one of the audio segments or the more than one of the video segments, or both, along with a corresponding unique identifier of the global object;

generate, in the schema, at least one local object defining an identifier parameter that references the global object using the corresponding unique identifier of the global object; and output the schema as a manifest for the content.

21. The non-transitory, computer-readable medium of claim 20, wherein the manifest is a JavaScript Object Notation (JSON) manifest.

22. The non-transitory, computer-readable medium of claim 20, wherein, prior to parsing, the instructions comprise instructions to:

execute a streaming encoder on a source file of the content to generate the audio segments of the content, the video segments of the content, and either the DASH or HLS manifest of the content.

23. The non-transitory, computer-readable medium of claim 20, wherein the instructions to generate the global object comprise instructions to:

generate, in the schema, a plurality of global objects and a plurality of corresponding unique identifiers, wherein relationships between the plurality of global objects and the plurality of corresponding unique identifiers are tracked to ensure that, within the schema, each of the plurality of corresponding unique identifiers refers to only one of the plurality of global objects.

24. The non-transitory, computer-readable medium of claim 23, wherein the plurality of global objects comprises one or more global timeline objects, one or more global digital rights management (DRM) objects, or a combination thereof, and wherein the plurality of corresponding unique identifiers comprises one or more audio timeline identifiers, one or more video timeline identifiers, one or more DRM information identifiers, or a combination thereof.

25. A device, comprising:

a memory; and at least one processor coupled to the memory and configured to:

encode content to generate audio segments of the content, video segments of the content, or a combination thereof, from a source file; and generate a manifest for the content based on information determined during the encoding, wherein the manifest comprises:

a global object defining at least one parameter that is shared with a plurality of the audio segments, the video segments, or the combination thereof along with a corresponding unique identifier of the global object; and for each of the plurality of the audio segments, the video segments, or the combination thereof, at least one local object defining an identifier parameter that references the global object using the corresponding unique identifier of the global object.

26. The device of claim 25, wherein the manifest is a JavaScript Object Notation (JSON) manifest.

27. The device of claim 25, wherein the at least one processor is configured to generate the manifest by:

generating, within the manifest, a plurality of global objects and a plurality of corresponding unique identifiers, wherein relationships between the plurality of global objects and the plurality of corresponding unique identifiers are tracked to ensure that, within the manifest, each of the plurality of corresponding unique identifiers refers to only one of the plurality of global objects.

28. The device of claim 27, wherein the plurality of global objects comprises one or more global timeline objects, one or more global digital rights management (DRM) objects, or a combination thereof, and wherein the plurality of corresponding unique identifiers comprises one or more audio timeline identifiers, one or more video timeline identifiers, one or more DRM information identifiers, or a combination thereof.

29. A method, comprising:

encoding content to generate audio segments of the content, video segments of the content, or a combination thereof, from a source file; and generating a manifest for the content based on information determined during the encoding, wherein the manifest comprises:

a global object defining at least one parameter that is shared by a plurality of the audio segments, the video segments, or the combination thereof along with a corresponding unique identifier of the global object; and for each of the plurality of the audio segments, the video segments, or the combination thereof, at least one local object defining an identifier parameter that references the global object using the corresponding unique identifier of the global object.

30. The method of claim 29, wherein the manifest is a JavaScript Object Notation (JSON) manifest.

31. The method of claim 29, wherein generating the manifest comprises:

generating, within the manifest, a plurality of global objects and a plurality of corresponding unique identifiers, wherein relationships between the plurality of global objects and the plurality of corresponding unique identifiers are tracked to ensure that, within the manifest, each of the plurality of corresponding unique identifiers refers to only one of the plurality of global objects.

* * * * *